UNITED STATES PATENT OFFICE.

HORACE M. WILLIAMS, OF PROVIDENCE, RHODE ISLAND, ASSIGNOR TO ELECTROL MANUFACTURING COMPANY, A CORPORATION OF RHODE ISLAND.

PROCESS OF MAKING ELECTRIC STORAGE BATTERIES.

1,417,007.     Specification of Letters Patent.     Patented May 23, 1922.

No Drawing.     Application filed August 19, 1920. Serial No. 404,667.

*To all whom it may concern:*

Be it known that I, HORACE M. WILLIAMS, a citizen of the United States of America, residing at Providence, county of Providence, State of Rhode Island, have invented certain new and useful Improvements in Processes of Making Electric Storage Batteries, of which the following is a specification.

My invention relates to the process of making or "setting up" electric storage batteries having lead plates and a solid electrolyte of the general character described in my pending application Serial No. 330,893 filed October 15, 1919.

Said solid electrolyte is preferably formed of colloidal silica, with possible admixture of other material, and sulphuric acid in suspension in said silica, which silica has been produced in situ by pouring a mixture of liquid silicate of soda and dilute sulphuric acid into the battery cell. In a few minutes after such mixing and pouring, a portion of the acid combines with the silicate of soda to form a large volume of colloidal silica and the residual acid solution which remains in suspension on the highly porous mass of silica is capable of electrolytic action on the lead plates in the usual way when the battery is charged and discharged.

My present invention is based on the discovery that to produce an entirely satisfactory battery of this kind it is necessary to prepare the plates by several preliminary charges and discharges in a separate acid electrolyte before the silicate of soda and acid solution is poured around the plates, and that in such preparation of the plates they should be finally charged or discharged to a point that will reduce the sulphuric acid in their pores to a specific gravity substantially equal to that of the residual acid which will occur in the battery filling after the solid filling has been introduced and the reaction producing the colloidal silica has been completed. As an example of the best method at present known to me in which my invention may be carried out, I may state the following:

Fully charge the battery at the rate recommended by the manufacturer using the standard sulphuric acid solution as the electrolyte until the voltage reaches 2.55 per cell.

Take a cadmium reading of both positive and negative plates. These readings should be 2.40 to 2.45 volts for the positive plates and .10 to .15 volts for the negative plates.

If any negative plate reads less than .10 volts, it lacks capacity and should be overcharged at a low rate in order not to injure the positives.

If the negatives do not improve by such treatment discharge the battery at the 4 hour rate until voltage drops to 1.80, per cell, and recharge. It is advisable to empty the cells and use fresh acid before this discharging, as impurities in the electrolyte will cause trouble with the plates.

The density of the electrolyte in all cells should be equalized before discharging. In most batteries which are used for vehicles or starting and lighting, the proper density should be 1.300 specific gravity at a temperature of 60° Fahr.

If, after re-charging, each cell shows the proper voltage and both positive and negative cadmium readings are correct, and the electrolyte is of the right density, the battery is fully charged, and in proper condition. The battery should then be discharged until the said electrolyte has a specific gravity of about 1.200.

In discharging, if a weak cell drops to 1.8 volts before the rest, cut it out and continue discharge. The weak cell will receive an overcharge when the battery is recharged, which may correct the trouble.

The liquid electrolyte is then poured out and a mixture introduced which on "setting" around the plates in each cell will produce the desired colloidal mineral filling, holding in suspension a residual sulphuric acid of a specific gravity of about 1.200. I prefer to use in this portion of my process commercial silicate of soda mixed with about three quarters of one per cent by volume of methyl salicylate, commonly called synthetic oil of wintergreen and an equal amount of a suitable liquid coal tar product, such as the material known commercially as West's disinfectant. This mixture is then diluted with three (3) volumes of water, and after the battery plates have been treated as above described, the diluted mixture is thoroughly mixed with five (5) volumes of sulphuric acid of a specific gravity of 1.400 and the final mixture poured into the cells around the plates.

In a few minutes all the silicate of soda in the solution combines with its proper proportion of the acid forming a voluminous mass of colloidal silica, and a relatively small amount of sodium sulphate. The colloidal silica fills the cell and retains in suspension the surplus of the sulphuric acid which will have a specific gravity of a little over 1.200 or almost exactly the same as that of the acid existing in the pores of the plates. A perfectly balanced battery is thus produced.

Upon fully charging the battery so formed it will be found to develop substantially the same efficiency and capacity as though it had a liquid acid electrolyte, and to be devoid of the disadvantages due to the corrosive action of the spraying, slopping and creeping liquid acid electrolyte. Also the plates of batteries with this filling are practically proof against sulphating and "shedding," and have a long life under the most trying conditions of use.

The solid filling so formed is of a stiff, gelatinous consistency and will not crack or break up under standard conditions of use of the battery. There is a slow evaporation of the water content which should be remedied by occasionally pouring a little fresh water into the mass which tends to become too dry and hard by slow evaporation of the liquid contents.

Having described my invention, I claim:

1. The herein described method of forming electric storage batteries with a solid filling surrounding lead plates and holding the electrolyte in suspension, which comprises the following steps: first, charging and discharging the plates in a free solution of acid electrolyte until the acid in their pores is of a predetermined specific gravity within the standard battery range; second, removing the free solution of acid electrolyte and substituting a fluid mixture which on the completion of internal chemical reactions will form a solid mass holding in suspension a residual portion of the same acid electrolyte of substantially the same predetermined specific gravity.

2. The herein described method of forming electric storage batteries with a solid filling surrounding lead plates and holding a sulphuric acid electrolyte in suspension, which comprises the following steps: first, charging and discharging the plates in a free solution of sulphuric acid of original standard battery specific gravity until the acid in the pores of the plates has a specific gravity approximating 1.200; second, removing said free electrolyte and substituting a mixture by volume of liquid silicate of soda, one part, water, three parts, and sulphuric acid of 1.400 specific gravity, five parts, whereby after chemical combination of the silicate of soda with a portion of the acid to form a voluminous mass of colloidal silica of gelatinous consistency, there will remain in suspension in said mass a residual content of sulphuric acid of approximately 1.200 specific gravity, as the active electrolyte for the battery so produced.

HORACE M. WILLIAMS.